(12) United States Patent
Kwon et al.

(10) Patent No.: US 12,493,081 B2
(45) Date of Patent: Dec. 9, 2025

(54) PRESSING SHORT-CIRCUIT INSPECTOR AND PRESSING SHORT-CIRCUIT INSPECTION METHOD FOR BATTERY CELL

(71) Applicant: LG ENERGY SOLUTION, LTD., Seoul (KR)

(72) Inventors: Dae Hyeoung Kwon, Daejeon (KR); Jea Gyeong Kim, Daejeon (KR); Kyong Su Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/565,194

(22) PCT Filed: Jan. 31, 2023

(86) PCT No.: PCT/KR2023/001378
§ 371 (c)(1),
(2) Date: Nov. 29, 2023

(87) PCT Pub. No.: WO2023/167432
PCT Pub. Date: Sep. 7, 2023

(65) Prior Publication Data
US 2024/0264243 A1 Aug. 8, 2024

(30) Foreign Application Priority Data
Mar. 2, 2022 (KR) .................. 10-2022-0027074

(51) Int. Cl.
*G01R 31/52* (2020.01)
*G01R 31/36* (2020.01)
(Continued)

(52) U.S. Cl.
CPC ......... *G01R 31/52* (2020.01); *G01R 31/3644* (2013.01); *G01R 31/3835* (2019.01)

(58) Field of Classification Search
CPC .................. G01R 31/3644; G01R 31/52; G01R 31/3835; H01M 10/4285; H01M 10/0481; H01M 10/42; Y02E 60/10
See application file for complete search history.

(56) References Cited

U.S. PATENT DOCUMENTS

| 2014/0123472 A1 | 5/2014 | Iwase |
| 2018/0191023 A1 | 7/2018 | Cao et al. |

(Continued)

FOREIGN PATENT DOCUMENTS

| CN | 103543381 A | 1/2014 |
| CN | 103811796 A | 5/2014 |

(Continued)

OTHER PUBLICATIONS

International Search Report (PCT/ISA/210) issued in PCT/KR2023/001378 mailed on May 2, 2023.

*Primary Examiner* — Eman A Alkafawi
*Assistant Examiner* — Suresh K Rajaputra
(74) *Attorney, Agent, or Firm* — Birch, Stewart, Kolasch & Birch, LLP

(57) ABSTRACT

A pressing short-circuit inspector for a battery cell includes a plurality of plates disposed so that a distance therebetween is adjustable; a lifter slidably coupled to each of the plates to ascend and descend vertically from an upper end of the plate; an interleaving support that is provided between two adjacent plates, has one end fixed to the lifter coupled to one of the two adjacent plates and the other end fixed to the lifter coupled to the other of the two adjacent plates, and supports a weight of the battery cell when the battery cell is seated thereon; and a pressing jig that presses the outermost plate to press the battery cell disposed on the interleaving support between the plates.

10 Claims, 6 Drawing Sheets

(51) Int. Cl.
　　　*G01R 31/38*　　　(2006.01)
　　　*G01R 31/3835*　　(2019.01)

(56) References Cited

U.S. PATENT DOCUMENTS

| | | |
|---|---|---|
| 2020/0280090 A1 | 9/2020 | Son et al. |
| 2021/0190874 A1* | 6/2021 | Kim .................... H01M 10/482 |
| 2022/0065948 A1* | 3/2022 | Kim .................. H01M 10/4285 |
| 2022/0263143 A1 | 8/2022 | Son |

FOREIGN PATENT DOCUMENTS

| | | |
|---|---|---|
| JP | 2002-134176 A | 5/2002 |
| JP | 2022-514578 A | 2/2022 |
| KR | 10-2011-0091061 A | 8/2011 |
| KR | 10-1521267 B1 | 5/2015 |
| KR | 10-1793162 B1 | 11/2017 |
| KR | 10-1896218 B1 | 9/2018 |
| KR | 10-2020-0017826 A | 2/2020 |
| KR | 10-2020-0042801 A | 4/2020 |
| KR | 10-2146781 B1 | 8/2020 |
| KR | 10-2191403 B1 | 12/2020 |
| KR | 10-2021-0026486 A | 3/2021 |
| KR | 10-2021-0033328 A | 3/2021 |
| KR | 10-2259455 B1 | 6/2021 |
| KR | 10-2280334 B1 | 7/2021 |
| KR | 10-2021-0120294 A | 10/2021 |

* cited by examiner

PRESSING SHORT-CIRCUIT INSPECTOR AND PRESSING SHORT-CIRCUIT INSPECTION METHOD FOR BATTERY CELL

CROSS-REFERENCE TO RELATED APPLICATION

The present application claims the benefit of the priority of Korean Patent Application No. 10-2022-0027074, filed on Mar. 2, 2022, which is hereby incorporated by reference in its entirety.

TECHNICAL FIELD

The present invention relates to a pressing short-circuit inspector and pressing short-circuit inspection method for a battery cell, and more particularly, to a pressing short-circuit inspector for a battery cell, which is capable of easily adjusting a seating height of the battery cell without replacing an interleaving support according to a size and a thickness of the battery cell, and a pressing short-circuit inspection method using the pressing short-circuit inspector.

BACKGROUND ART

Battery cells (secondary batteries) that are chargeable and dischargeable and have a small weight and also a high energy density and output density are widely used as energy sources for various devices.

In addition, hybrid electric vehicles (HEV), plug-in hybrid electric vehicles (PHEV), battery electric vehicles (BEV), electric vehicles (EV) and the like are proposed as alternative solutions for solving problems of air pollution and greenhouse gases caused by typical internal combustion engine vehicles using fossil fuel, such as gasoline vehicles and diesel vehicles. The battery cells also receive attention as power sources of such alternative vehicles to the internal combustion engine vehicles.

In addition, multiple battery cells are coupled in the form of a battery module so as to increase an output and a capacity, and multiple battery modules are mounted in an electric vehicle or the like in a state of being coupled into a battery pack.

Accordingly, the battery cells are generally manufactured in a pouch type having a plate shape, which has a predetermined thickness and size so that the multiple battery cells may be easily connected in series or in parallel and easily mounted in one module frame.

A pouch type battery cell has a structure in which an electrode assembly having a structure, in which a negative electrode, a separate, and a positive electrode are alternately stacked, is embedded together with an electrolyte in a pouch type case, and a negative electrode lead and a positive electrode lead that are connected to the negative electrode and the positive electrode, respectively, protrude from a case (pouch).

In the battery cells, voltage drop of a self-discharge rate or higher may also occur due to a defect occurring during manufacturing of the electrode assembly. Thus, a defective product is detected from the individual battery cells through a pressing short-circuit inspection.

FIG. 1A is a perspective view of a pressing short-circuit inspector for a battery cell according to the related art. FIG. 1B is a view illustrating a state when the battery cell is seated at a portion indicated by A in FIG. 1A.

Referring to the drawings, the pressing short-circuit inspector that performs a pressing short-circuit inspection for the battery cell includes a plurality of plates 2, which are disposed so that a distance therebetween is adjustable, and the plates 2 adjacent to each other are connected by an interleaving support 3.

That is, the interleaving support 3 has one end coupled to an upper end of the plate 2 at one side, and the other end coupled to an upper end of the plate 2 at the other side. The interleaving support 3 has a shape that is bent downward between the adjacent plates 2 so that a downward valley is defined, and each of individual battery cells 1 is seated on the downward valley.

A pressing jig 5 presses each of the two outermost plates 2 in a direction (an Y direction), in which a gap between the adjacent plates 2 gradually decreases, so that a pressure is applied to both side surfaces of each of the battery cells 1.

In a state in which the pressure is applied to the battery cells 1, metering pins (not shown) approach each of both sides in a longitudinal direction (an X direction) of the battery cells 1, and each of the metering pins is connected to an electrode lead (a positive electrode lead or a negative electrode lead) of the battery cell 1. While the pressure is applied, changes in voltage of the battery cells 1 are measured to inspect whether a defect occurs.

Here, the metering pins are coupled to a measuring device to have a structure in which the height is not adjustable to match a height of the electrode lead of the battery cell 1. Thus, the adjustment of a seating height in the interleaving support 3 has to be performed according to a size of the battery cell 1 so as to match the height of the metering pins.

In a structure according to the related art, when the end of the interleaving support 3 is seated on the upper end of the plate 2, a support member 4 is provided on the end of the interleaving support 3 to fix the interleaving support 3 to the plate 2. Thus, in order to replace the interleaving support 3, re-fixing has to be performed after separating the support member 4 and individually separating and replacing the interleaving support 3.

However, in such a structure according to the related art, the replacing of the interleaving support 3 has to be performed according to the size of the battery cell 1 and thus, there are problems that material costs of the interleaving support 3 and the whole inspection time increase.

DISCLOSURE OF THE INVENTION

Technical Problem

Therefore, a main object of the present invention is to provide a pressing short-circuit inspector for a battery cell, which is capable of easily adjusting a height of the battery cell even without replacement of an interleaving support so as to resolve the problem of the related art, and a pressing short-circuit inspection method using the pressing short-circuit inspector.

Technical Solution

A pressing short-circuit inspector for a battery cell according to the present invention for achieving the object as described above is a pressing short-circuit inspector for a battery cell, which determines whether short-circuit occurs in a state in which a pressure is applied to the battery cell. The pressing short-circuit inspector for the battery cell includes a plurality of plates arranged such that a distance between two adjacent plates is adjustable; a lifter slidably coupled to each of the plates to ascend and descend vertically from an upper end of the plate; an interleaving support provided between the two adjacent plates, the interleaving support having a first end fixed to the lifter coupled to a first plate of the two adjacent plates and a second end fixed to the lifter coupled to a second plate of the two adjacent plates, the interleaving support being configured to support a weight of a battery cell when the battery cell is seated thereon; and a pressing jig being configured to press an outermost plate to press the battery cell disposed on the interleaving support between the two adjacent plates.

The interleaving support fixed to an upper end of each of the two adjacent plates has a shape in which a middle portion is bent so that a valley is defined, and the battery cell is seated to be disposed on the valley.

The pressing short-circuit inspector for the battery cell further includes a support that fixes the interleaving support to an upper end of the lifter when the interleaving support is seated on the upper end of the lifter.

The support is detachably coupled to the upper end of the lifter.

The support is magnetic.

All of the lifters are connected to one actuator and configured so that all of the lifters are ascendable or descendable at the same time by the actuator.

Alternatively, each lifter is individually connected to an actuator and configured so that one lifter or a plurality of lifters are ascendable or descendable in pairs.

The actuator is a servo motor that is forward and backward rotatable.

The pressing short-circuit inspector for the battery cell further includes a buffer pad made of a material having elasticity attached to each plate at a point at which the pressure is transmitted to the battery cell when the battery cell is seated on the interleaving support and the plates are slid in a direction in which the plates approach each other by the pressing jig.

In addition, a pressing short-circuit inspection method for a battery cell provided in the present invention is a pressing short-circuit inspection method for a battery cell, which determines whether short-circuit occurs in a state in which a pressure is applied to the battery cell. The pressing short-circuit inspection method includes seating one battery cell on an interleaving support connecting adjacent plates to each other; decreasing or increasing in height of a point at which the interleaving support is coupled to each of the adjacent plates; and pressing the adjacent plates in a direction in which a gap between the adjacent plates gradually decreases, wherein, in the decreasing or increasing in height, the height of the point at which the interleaving support is to each of the adjacent plates is adjusted to have the same height at the same time.

Advantageous Effects

In the present invention having the technical features as above, the valley height of the interleaving support on which the battery cell is seated may be adjusted through the lifter and thus, the interleaving support may not need to be replaced. Accordingly, when compared to the structure according to the related art, the inspection time may be reduced and the consumption of the interleaving support may be reduced.

The support that fixes the interleaving support may be provided as the magnet so that the replacement of the interleaving support is more easily performed.

In addition, the lifters may be configured to be ascendable or descendable at the same time so that the valley height adjustment of the interleaving support is more rapidly performed.

Alternatively, the lifters may be configured to be individually ascendable or descendable so that the battery cells having different the sizes are inspected together to more reduce the inspection time.

Moreover, the buffer pad made of the material having the elasticity may be attached to the plate to prevent the outer appearance of the battery cell from being damaged when the pressing is carried out.

MODE FOR CARRYING OUT THE INVENTION

Figure 1A:
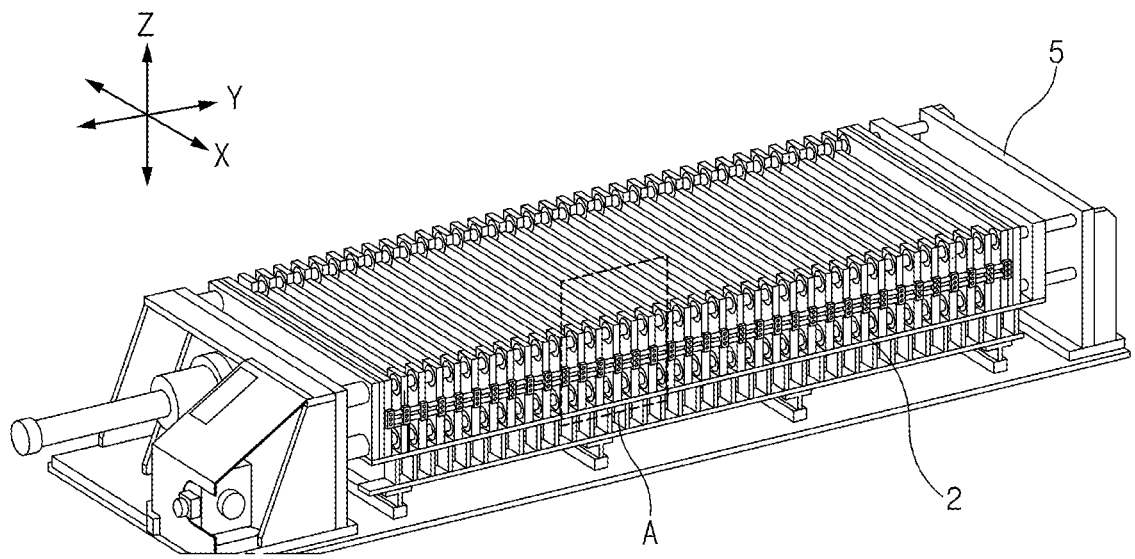
FIG. 1A is a perspective view of a pressing short-circuit inspector for a battery cell according to the related art.
Figure 1B:
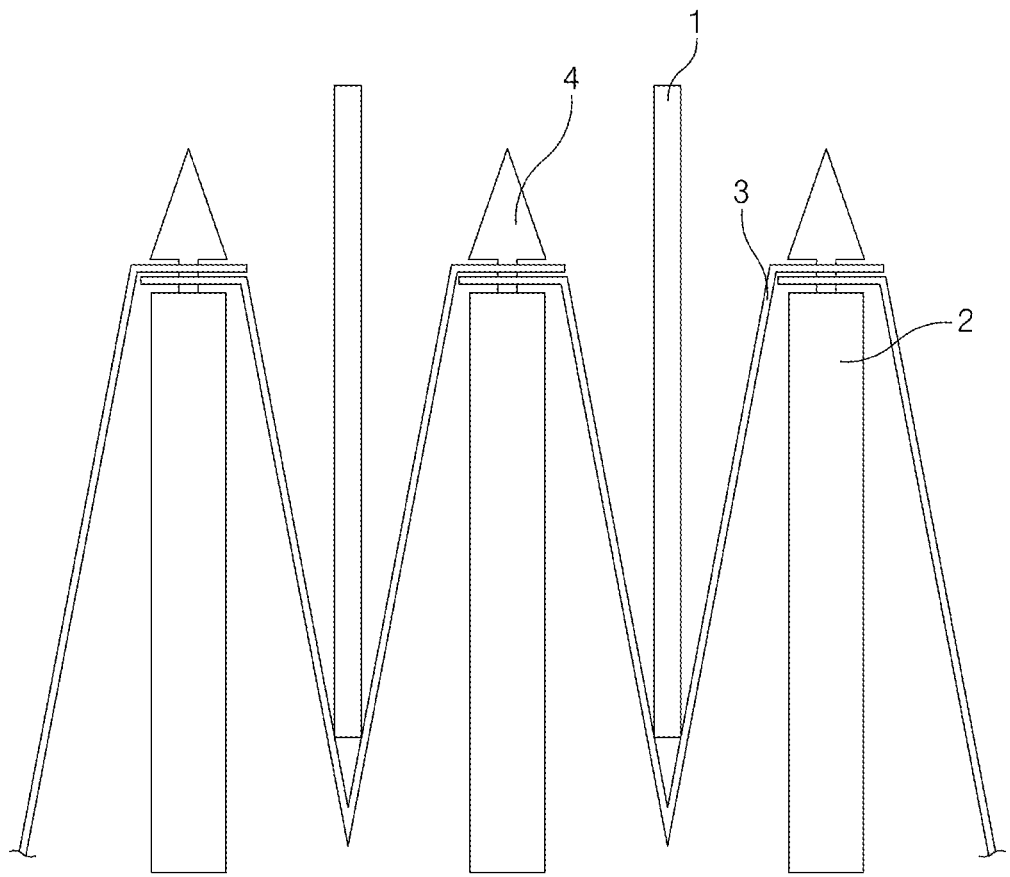
FIG. 1B is a view illustrating a state when the battery cell is seated at a portion indicated by A in FIG. 1A.

Hereinafter, the present invention will be described in detail with reference to the accompanying drawings to enable those skilled in the art to which the present invention pertains to easily carry out the present invention. The present invention may, however, be embodied in different forms and should not be construed as limited to the embodiments set forth herein.

The parts unrelated to the description will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a pressing short-circuit inspector and pressing short-circuit inspection method for a battery cell, which detects whether short-circuit occurs in a state in which a pressure is applied to a battery cell (1). Hereinafter, embodiments provided in the present invention will be described in more detail with reference to the accompanying drawings.

First Embodiment

The present invention provides, as a first embodiment, a pressing short-circuit inspector for a battery cell, which is capable of easily adjusting a sealing height of a battery cell 1 even without replacement of an interleaving support 30.

Figure 2:
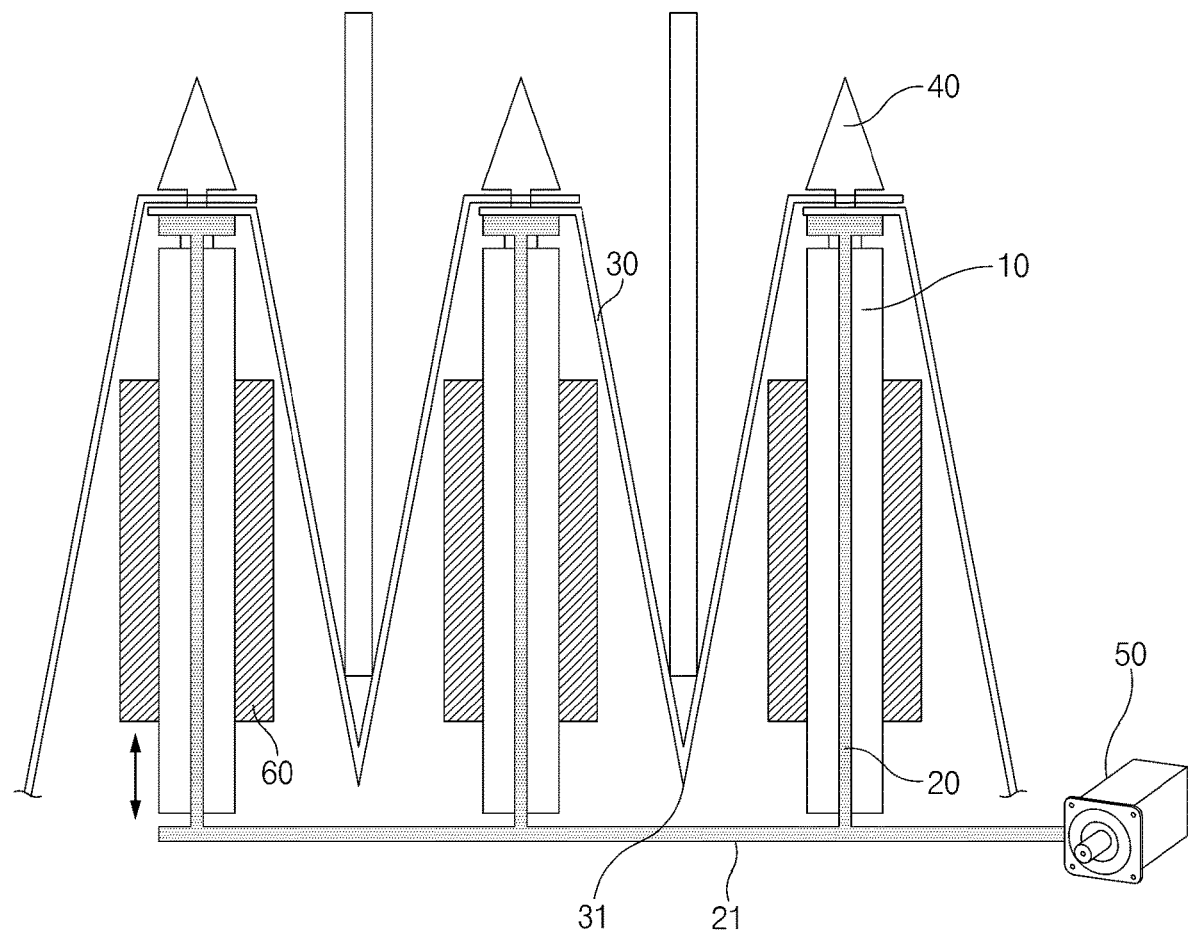
FIG. 2 is a schematic view illustrating a state in which a lifter is mounted in each of plates and the lifters are connected together to one actuator.
Figure 3:
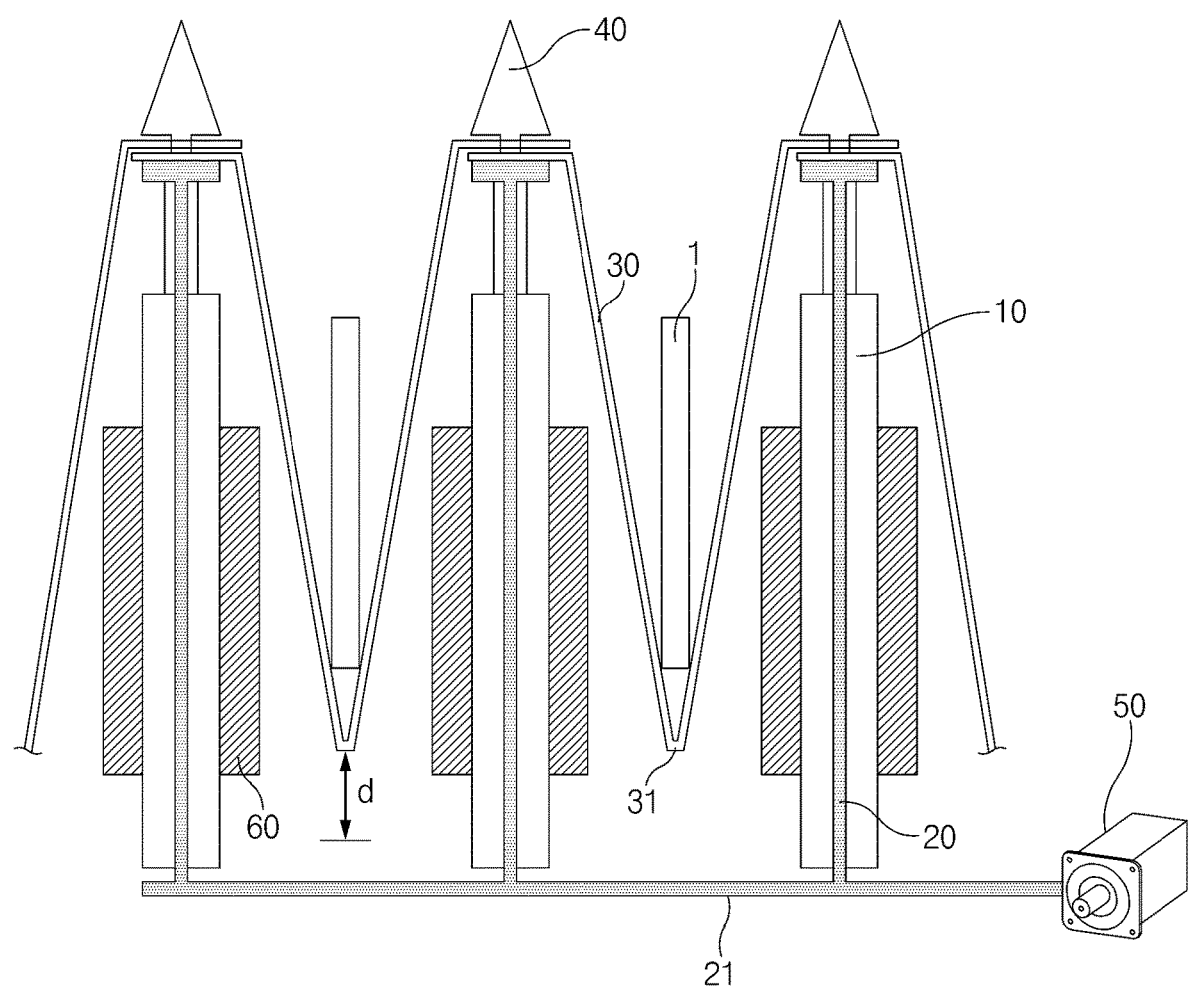
FIG. 3 is a view illustrating a state in which the lifter in the state in FIG. 2 ascends.
Figure 4:
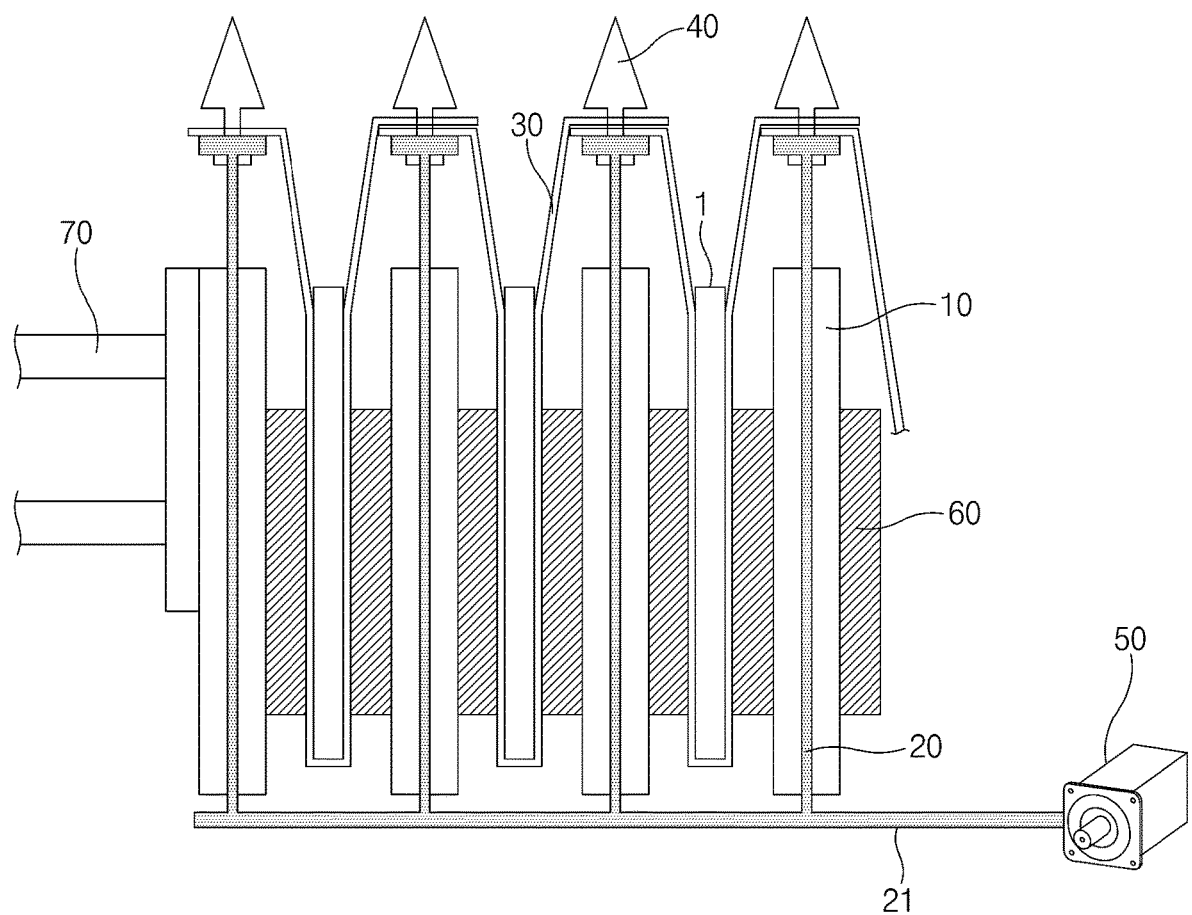
FIG. 4 is a view illustrating a state in which a pressing jig presses the outermost plate in the state in FIG. 3.

FIG. 2 is a schematic view illustrating a state in which a lifter is mounted in each of plates and the lifters are connected together to one actuator. FIG. 3 is a view illustrating a state in which the lifter in the state in FIG. 2 ascends. FIG. 4 is a view illustrating a state in which a pressing jig presses the outermost plate in the state in FIG. 3.

Referring the drawings, as illustrated in FIG. 4, the pressing short-circuit inspector for the battery cell according to the present invention has a structure in which a plurality of plates 10 are disposed to stand vertically (a Z direction in FIG. 1A) and a pressing jig 70 is disposed at an end at each of both sides (or an end at one side). In the structure, the battery cell 1 is pressed when the battery cell 1 is inserted between adjacent plates 10.

In a state in which pressure is applied to the plurality of battery cells 1, metering pins (not shown) approach each of both sides in a longitudinal direction (an X direction in FIG. 1A) of the battery cells 1, and each of the metering pins is connected to an electrode lead (a positive electrode lead or a negative electrode lead) of the battery cell. While the pressure is applied to the battery cells 1, changes in voltage are measured to inspect whether a defect occurs.

Here, the metering pins are in a state of being fixed in height and thus, the structure according to the related art is inconvenient in that the interleaving support has to be replaced for each size of the battery cell. However, the pressing short-circuit inspector provided in this embodiment has an advantage that a height of the interleaving support 30 (a height at which the battery cell is seated on the interleaving support) is adjustable and thus, the replacement of the interleaving support 30 is unnecessary.

That is, the pressing short-circuit inspector for the battery cell provided in this embodiment is configured by including the plates 10, the interleaving support 30, and the pressing jig 70 like the structure according to the related art, so as to determine whether short-circuit occurs in a state in which the pressure is applied to the battery cell. The pressing short-circuit inspector for the battery cell is additionally provided with a lifter 20 capable of adjusting the height of the interleaving support 30.

The plurality of plates 10 are disposed so that a distance therebetween is adjustable. That is, the plates 10 are coupled to a sliding rail or the like and disposed to be slidable only in one direction (the Y direction in FIG. 1A or a left and right direction in FIG. 2).

The lifter 20 is slidably coupled to each of the plates 10 to ascend and descend vertically (the Z direction in FIG. 1A) from an upper end of the plate 10. The lifter 20 also moves together with the sliding of the plate 10. Here, the lifters 20 may be configured so that all of the lifters 20 are connected to one actuator 50 so as to be ascendable or descendable at the same time.

For example, when the actuator 50 is provided as a servo motor that is forward and backward rotatable (and has an adjustable speed), the lifter 20 may be configured so that when the servo motor rotates a main linking device 21, a sub-linking device (not shown) connected to each of the lifters 20 receives power from the main linking device 21 to allow the lifter 20 to ascend or descend. Here, while the plate 10 is slid, the power transmission between the main linking device 21 and the sub-linking device may be cut off, and a braking device or the like may be embedded in the sub-linking device so that movement of the sub-linking device is cut off even when the power transmission is cut off.

Alternatively, when the actuator 50 is provided as a pneumatic tank or a hydraulic tank, the lifter 20 may be configured so that compressed air or hydraulic oil is supplied to or collected from each of sub-tubes (not shown), which is connected to the lifter 20, through a main tube (not shown) to allow the lifter 20 to ascend or descend. Likewise in this case, the main tube and the sub-tubes may be separated from each other while the plate 10 is slid, and the height of the lifter 20 may be fixed while a pressure of the compressed air or hydraulic oil is maintained in the sub-tube.

Those skilled in the art could clearly understand that various types of power systems capable of elevating the lifter, and various types of power transmission devices suitable for the power systems may be provided as the actuator 50 in addition to the servo motor, the pneumatic tank, and the hydraulic tank, and could easily carry out the lifter 20 and the actuator 50 provided in the present invention by using known techniques.

The interleaving support 30 has both ends that are fixed onto adjacent lifters 20, respectively. That is, each of the interleaving supports 30 is provided between the adjacent plates 10, has one end fixed to the lifter 20 coupled to one of the adjacent plates 10 and the other end fixed to the lifter 20 coupled to the other of the adjacent plates 10, and supports the weight of the battery cell 1 when the battery cell 1 is seated on the interleaving support 30. That is, the interleaving support 30 has a shape in which a middle portion is bent so that a valley 31 is defined between the adjacent plates 10, and the battery cell 1 is seated to be disposed on the valley 31.

In addition, the pressing jig 70 is disposed to simultaneously press at least one or both of the outermost plates 10 that are disposed at both sides, respectively. Accordingly, the outermost plate 10 is pressed to press the battery cell 1 disposed on the interleaving support 30 between the plates 10. The pressing jig 70 is also configured to press the plate 10 through a motor, air pressure, oil pressure, or the like. The pressing jig 70 is configured so that when the pressing jig 70 presses one of the outermost plates 10, a position of the other plate 10 is fixed. When the pressing jig 70 is disposed at the outermost plate 10 at each of both sides, the pressing jig 70 is configured to be slidable so that a pressure is applied in a direction in which a gap between the plates 10 gradually decreases.

Thus, when the pressing jig 70 presses the plate 10, the pressure is applied to the battery cell 1 seated on the interleaving support 30 between the adjacent plates 10, as illustrated in FIG. 3.

A buffer pad 60 is attached to the plate 10 in order to prevent breakage, deformation or the like of the battery cell 1 when the pressure is applied to the plate 10.

That is, the buffer pad 60 made of a material (e.g., urethane) having elasticity is attached to a point at which the pressure is transmitted to the battery cell 1 when the battery cell 1 is seated on the interleaving support 30 and the plates 10 are slid in a direction in which the plates 10 approach each other by the pressing jig 70.

The present invention includes a support 40 that fixes the interleaving support 30 to the upper end of the lifter 20 when the interleaving support 30 is seated on the upper end of the lifter 20. The support 40 is detachably coupled to the upper end of the lifter 20.

For example, the support 40 may be provided in the form of a bolt having an outer circumference on which a thread is provided, and be fixed to the lifter 20 through screw-coupling. However, preferably, the support 40 is provided as a magnet so that a hole passing through the interleaving support 30 is not defined. That is, the support 40 has magnetism, and the upper end of the lifter 20 is made of a material to which the magnet sticks. Thus, when the interleaving support 30 is disposed on the lifter 20, the support 40 is seated on the lifter 20 and fixed to the lifter 20 by magnetic force. Accordingly, the fixing may be performed without damage to the interleaving support 30. In addition, as the support 40 is more rapidly detachable, replacement of the interleaving support 30 may be more rapidly performed.

In addition, as described above, the lifter 20 connected to each of the plates 10 may be configured so that all of the lifters 20 are connected to one actuator 50 and all of the lifters 20 are ascendable or descendable at the same time upon an operation of the actuator 50. However, the lifters 20 may be configured to individually ascend and descend.

Figure 5:
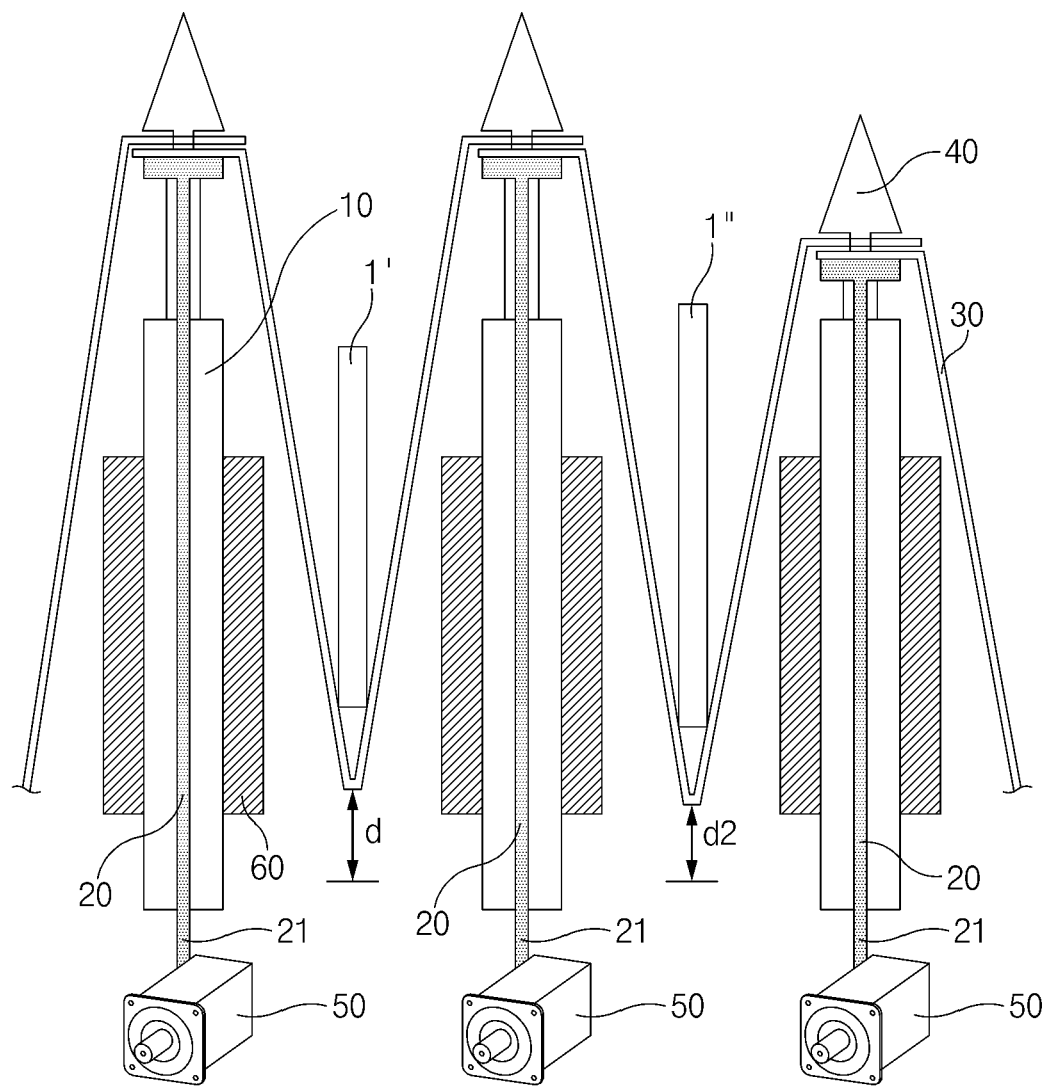
FIG. 5 is a schematic view illustrating a state in which a lifter is mounted in each of plates and each of the lifters is independently connected to an individual actuator.

That is, as schematically illustrated in FIG. 5 in which a lifter 20 is mounted in each of plates 10 and each of the lifters 20 is independently connected to an individual actuator 50, the individual actuators 50 may be configured to individually elevate the lifters 20 that are paired, respectively.

Thus, even when battery cells 1' and 1" having different sizes are seated on interleaving supports 30, respectively, relative heights d and d2 of valleys 31 of the interleaving supports 30 may be adjusted to match metering pins (not shown) having a fixed height, respectively. Although FIG. 5 illustrates that each of the lifters 20 is connected to one actuator 50, the lifters 20 may be configured so that two or more of the lifters 20 are grouped to be connected to one actuator 50.

Second Embodiment

The present invention provides, as a second embodiment, a pressing short-circuit inspection method for a battery cell, which is capable of easily adjusting a seating height of a battery cell 1 even without replacement of an interleaving support 30.

The pressing short-circuit inspection method for the battery cell provided in this embodiment is a pressing short-circuit inspection method for a battery cell, which determines whether short-circuit occurs in a state in which pressure is applied to the battery cell. The pressing short-circuit inspection method for the battery cell may be performed as an inspection method using the pressing short-circuit inspector for the battery cell described above.

The pressing short-circuit inspection method for the battery cell includes a battery cell seating process, an interleaving support height adjusting process, and a pressing process.

In the battery cell seating process, seating of individual battery cells 1 on interleaving supports 30, respectively, each of which is disposed to connect adjacent plates 10 to each other as illustrated in FIG. 2, is performed.

In the interleaving support height adjusting process, elevating of a lifter 20 is performed to increase or decrease in height of a point at which the interleaving support 30 is coupled to each of the plates 10. Preferably, the interleaving support height adjusting process is performed before the seating of the battery cells 1 is performed, but may be also performed after the seating of the battery cells 1 is performed.

Then, the pressing process is performed by pressing the plates 10 in a direction in which a gap between the adjacent plates 10 gradually decreases.

While the pressing process is performed, in a state in which a pressure is applied to the battery cells 1, metering pins (not shown) approach each of both sides in a longitudinal direction of the battery cells 1, and each of the metering pins is connected to an electrode lead (a positive electrode lead or a negative electrode lead) of the battery cell. While the pressure is applied to the battery cells 1, changes in voltage are measured to inspect whether a defect occurs.

In the interleaving support height adjusting process, the height of the point at which the interleaving support 30 is coupled is adjusted to have the same height at the same time.

In the present invention having the technical features as above, the height of the valley 31 of the interleaving support 30 on which the battery cell 1 is seated may be adjusted through the lifter 20 and thus, the interleaving support 30 may not need to be replaced. Accordingly, when compared to the structure according to the related art, the inspection time may be reduced and consumption of the interleaving support 30 may be reduced.

A support 40 that fixes the interleaving support 30 may be provided as a magnet so that the replacement of the interleaving support 30 is more easily performed.

In addition, the lifters 20 may be configured to be ascendable or descendable at the same time so that the valley height adjustment of the interleaving support is more rapidly performed.

Alternatively, the lifters 20 may be configured to be individually ascendable or descendable so that battery cells having different sizes are inspected together to more reduce the inspection time.

Moreover, a buffer pad 60 made of a material having elasticity may be attached to the plate 10 to prevent an outer appearance of the battery cell from being damaged when the pressing is performed.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

The invention claimed is:

1. A pressing short-circuit inspector for a battery cell, the pressing short-circuit inspector comprising:
a plurality of plates arranged such that a distance between two adjacent plates is adjustable;
a lifter slidably coupled to each of the plates to ascend and descend vertically from an upper end of the plate;
an interleaving support provided between the two adjacent plates, the interleaving support having a first end fixed to the lifter coupled to a first plate of the two adjacent plates and a second end fixed to the lifter coupled to a second plate of the two adjacent plates, the interleaving support being configured to support a weight of a battery cell when the battery cell is seated thereon; and
a pressing jig configured to press an outermost plate of the plurality of plates to press the battery cell located on the interleaving support between the two adjacent plates.

2. The pressing short-circuit inspector of claim 1, wherein the interleaving support fixed to an upper end of each of the two adjacent plates has a shape in which a middle portion is bent so that a valley is defined, and the battery cell is seated to be disposed on the valley.

3. The pressing short-circuit inspector of claim 1, further comprising a support configured to fix the interleaving support to an upper end of the lifter when the interleaving support is seated on the upper end of the lifter.

4. The pressing short-circuit inspector of claim 3, wherein the support is detachably coupled to the upper end of the lifter.

5. The pressing short-circuit inspector of claim 4, wherein the support is magnetic.

6. The pressing short-circuit inspector of claim 1, wherein all of the lifters are connected to one actuator so that all of the lifters are ascendable or descendable at the same time by the actuator.

7. The pressing short-circuit inspector of claim 1, wherein each lifter is individually connected to an actuator so that one lifter or a plurality of lifters are ascendable or descendable in pairs.

8. The pressing short-circuit inspector of claim 6, wherein the actuator is a servo motor that is forward and backward rotatable.

9. The pressing short-circuit inspector of claim 1, further comprising a buffer pad made of a material having elasticity attached to each plate at a point at which the pressure is transmitted to the battery cell when the battery cell is seated on the interleaving support and the plates are slid in a direction in which the plates approach each other by the pressing jig.

10. A pressing short-circuit inspection method for a battery cell, the pressing short-circuit inspection method comprising:
   seating one battery cell on an interleaving support connecting adjacent plates to each other;
   decreasing or increasing in height of a point at which the interleaving support is coupled to each of the adjacent plates; and
   pressing the adjacent plates in a direction in which a gap between the adjacent plates gradually decreases,
   wherein, in the decreasing or increasing in height, the height of the point at which the interleaving support is coupled to each of the adjacent plates is adjusted to have the same height at the same time.

* * * * *